United States Patent [19]
Schwager et al.

[11] Patent Number: 5,918,282
[45] Date of Patent: Jun. 29, 1999

[54] FUEL TANK PRESSURE SENSOR ASSEMBLY WITH INTEGRAL ROLLOVER PROTECTION

[75] Inventors: Bryce Andrew Schwager, Ypsilanti; Sudhir Parabdesai, Taylor, both of Mich.

[73] Assignee: Ford Global Technologies, Inc., Dearborn, Mich.

[21] Appl. No.: 08/976,749

[22] Filed: Nov. 24, 1997

[51] Int. Cl.⁶ ........................................................ G01L 7/00
[52] U.S. Cl. .............................................................. 73/756
[58] Field of Search .................................. 73/49.7, 118.1, 73/700, 756, 723; 123/518, 519, 520

[56] References Cited

U.S. PATENT DOCUMENTS

| | | |
|---|---|---|
| 4,162,021 | 7/1979 | Crute . |
| 4,646,772 | 3/1987 | Bergsma . |
| 4,655,238 | 4/1987 | Szlaga . |
| 4,960,153 | 10/1990 | Bergsma . |
| 5,065,782 | 11/1991 | Szlaga . |
| 5,083,583 | 1/1992 | Benjey . |
| 5,172,714 | 12/1992 | Kobayashi et al. . |
| 5,261,379 | 11/1993 | Lipinski et al. . |
| 5,267,470 | 12/1993 | Cook ........................................ 73/49.7 |
| 5,313,977 | 5/1994 | Bergsma . |
| 5,386,812 | 2/1995 | Curran et al. . |
| 5,404,756 | 4/1995 | Briggs et al. . |
| 5,404,907 | 4/1995 | Benjey et al. . |
| 5,411,004 | 5/1995 | Busato et al. . |
| 5,429,097 | 7/1995 | Wojts-saary et al. ..................... 123/520 |
| 5,438,877 | 8/1995 | Vowels et al. ............................. 73/756 |
| 5,657,734 | 8/1997 | Sawamoto et al. . |

*Primary Examiner*—Max Noori
*Assistant Examiner*—Abdullahi Aw-Musse
*Attorney, Agent, or Firm*—Donald A. Wilkinson

[57] ABSTRACT

A fuel tank pressure sensor assembly includes a pressure sensing element portion and a rollover valve portion. An area of reduced section between the sensor element portion and the valve portion provides a controlled fracture location for the pressure sensor assembly. In addition, the valve portion prevents inadvertent closure under normal vehicle operating conditions.

11 Claims, 2 Drawing Sheets

FUEL TANK PRESSURE SENSOR ASSEMBLY WITH INTEGRAL ROLLOVER PROTECTION

FIELD OF THE INVENTION

The present invention relates to fuel tank pressure sensor assemblies, and more particularly, to fuel tank pressure sensor assemblies restricting liquid fuel flow from the fuel tank.

BACKGROUND OF THE INVENTION

Conventional fuel delivery systems for automotive vehicles typically include a fuel tank pressure sensor, mounted on the fuel tank, to sense the vapor pressure within the tank. This information is relayed to an electronic engine controller so that the controller can determine whether a leak has occurred in the tank, for example, as required by On-Board Diagnostic (OBD II) requirements. In addition, the controller may use the sensed vapor pressure to determine when the tank must be purged. Purged vapor is then vented to the intake manifold of the engine to be consumed therein. Alternatively, the vapor may be stored in a carbon canister.

Prior art pressure sensor and vent valve assemblies, such as that disclosed in U.S. Pat. No. 5,267,470, include a body having a vent port extending into the fuel tank for evacuating purged vapor from the tank and a pressure sensor port communicating with a pressure sensor element for sensing vapor pressure therein. A check valve maybe located within the vent port so that should the vehicle inadvertently roll over, liquid fuel does not flow therethrough.

The inventors of the present invention have found certain disadvantages with these prior art pressure sensor and vent valve assemblies. For example, the pressure sensor and vent valve ports extend beyond the wall of the fuel tank. Thus, should a portion of the assembly shear off, either port may be exposed to the atmosphere resulting in liquid fuel potentially spilling from the fuel tank.

Further, the check valve assembly located within the vent valve may remain in the closed position during normal vehicle operating conditions.

Also, some prior art pressure sensor and vent valve assemblies utilize a check valve within the pressure sensor port. A disadvantage with these assemblies is that this check valve too may remain in the closed position, thereby preventing a proper pressure reading. As a result, the Malfunction Indicator Light (MIL) illuminates requiring the operator to service the vehicle, thereby increasing warranty costs.

SUMMARY OF THE INVENTION

An object of the present invention is to provide a fuel tank pressure sensor assembly for sensing vapor pressure within the fuel tank while simultaneously reducing the possibility of liquid fuel from flowing through the assembly. This object is achieved and disadvantages of prior art approaches are overcome by providing a novel fuel tank pressure sensor assembly for an automotive fuel tank. In one aspect of the invention, the fuel tank pressure sensor assembly includes a body defining an axis and having a rollover valve housing portion extending into the fuel tank when the assembly is mounted thereto and a pressure sensor housing portion extending away from the fuel tank when the assembly is mounted thereto. A mounting ledge is formed on the body between the rollover valve housing portion and the pressure sensor housing portion. The mounting ledge is adapted to lie adjacent the fuel tank when the assembly is mounted thereto. A pressure sensor is disposed within said pressure sensor housing portion. An axial extending column extends between the rollover valve housing portion and the pressure sensor housing portion. The column includes an orifice extending therethrough to allow the pressure sensor to sense fuel vapor pressure within the tank. The column has a smaller cross-sectional area relative to both the mounting ledge and the pressure sensor housing portion, thereby allowing the pressure sensor housing portion to controllably shear from the rollover valve housing portion. The assembly further includes a rollover valve element disposed within the rollover valve housing portion for substantially restricting liquid fuel from flowing from the fuel tank through the orifice. The rollover valve element has a generally semi-spherical sealing surface to seal the orifice under predetermined operating conditions.

An advantage of the present invention is that a low cost, easily manufactured, pressure sensor assembly is provided.

Another advantage of the present invention is that the possibility of fuel flowing from the tank through the pressure sensor assembly is reduced.

Yet another advantage of the present invention is that warranty costs may be reduced.

Other objects features and advantages of the present invention will be readily appreciated by the reader of the specification.

BRIEF DESCRIPTION OF THE DRAWINGS

The invention will now be described by way of example with reference to the accompanying drawings in which.

DETAILED DESCRIPTION OF THE PREFERRED EMBODIMENT

Figure 1:
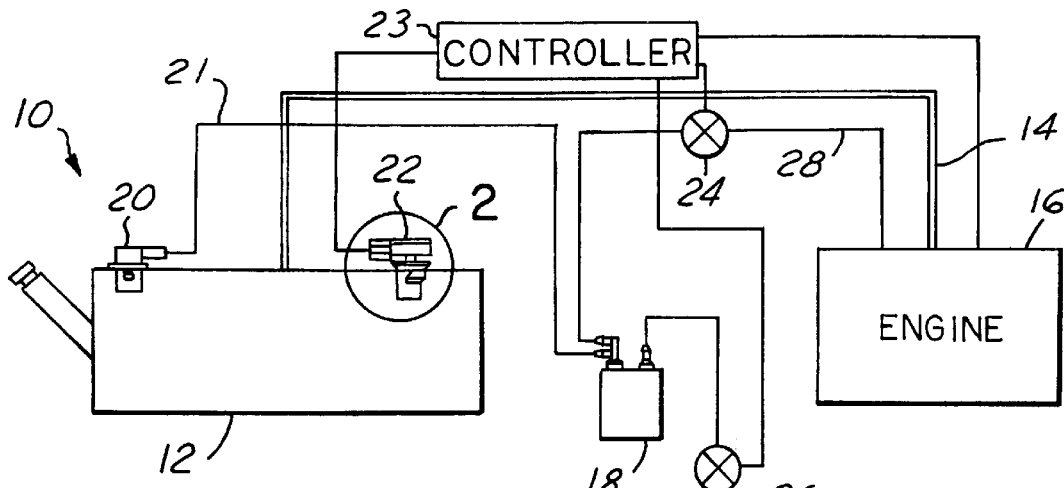
FIG. 1 is a diagrammatic representation of an automotive fuel system according to the present invention.

Fuel delivery systems 10, shown in FIG. 1, includes fuel tank 12 coupled to fuel line 14 for delivering fuel to engine 16. Fuel vapor flowing from fuel tank 12 may be stored in carbon canister 18 for use by engine 16. Vapor flows through vent valve 20, through vent line 21 into canister 18. As the pressure in tank 12 builds, pressure sensor assembly 22 senses the pressure therein and relays the information to engine controller 23 so that the controller can determine whether a leak has occurred in the tank, for example, as required by On-Board Diagnostic (OBD II) requirements, by determining whether the vapor pressure is within predetermined limits. In addition, controller 23 may use the sensed vapor pressure to determine when vapor in tank 12 must be purged. Thus, if the pressure is above a predetermined threshold, engine controller 23 signals solenoid valves 24 and 26, for example, so that the vapor may be consumed by engine 16. Alternatively, a direct purge line (not shown) with a solenoid valve (not shown) may extend from tank 12 to engine 16. In this case, should the vapor pressure exceed a predetermined threshold, engine controller 23 signals the solenoid valve (not shown) to allow the vapor in tank 12 to flow though the purge line (not shown) directly to engine 16.

Figure 2:
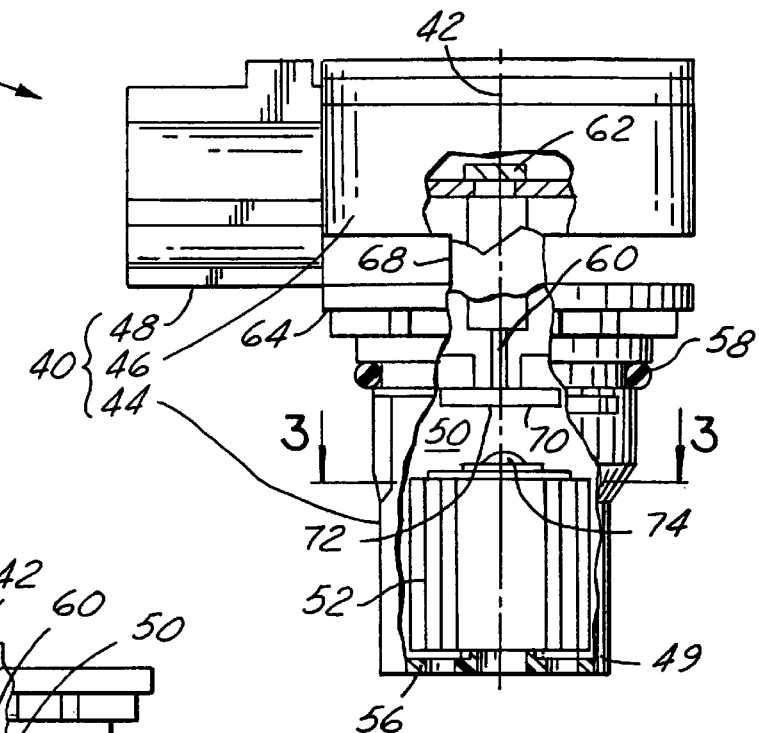
FIG. 2 is a side view of a pressure sensor assembly according to the present invention.
Figure 3:
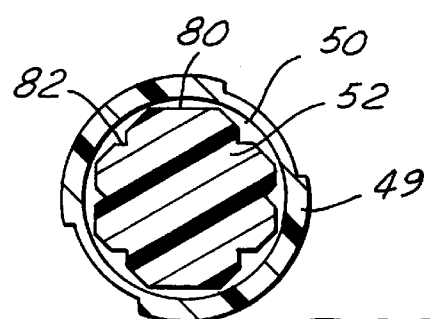
FIG. 3 is a cross-section taken along line 3—3 of FIG. 2.
Figure 4:
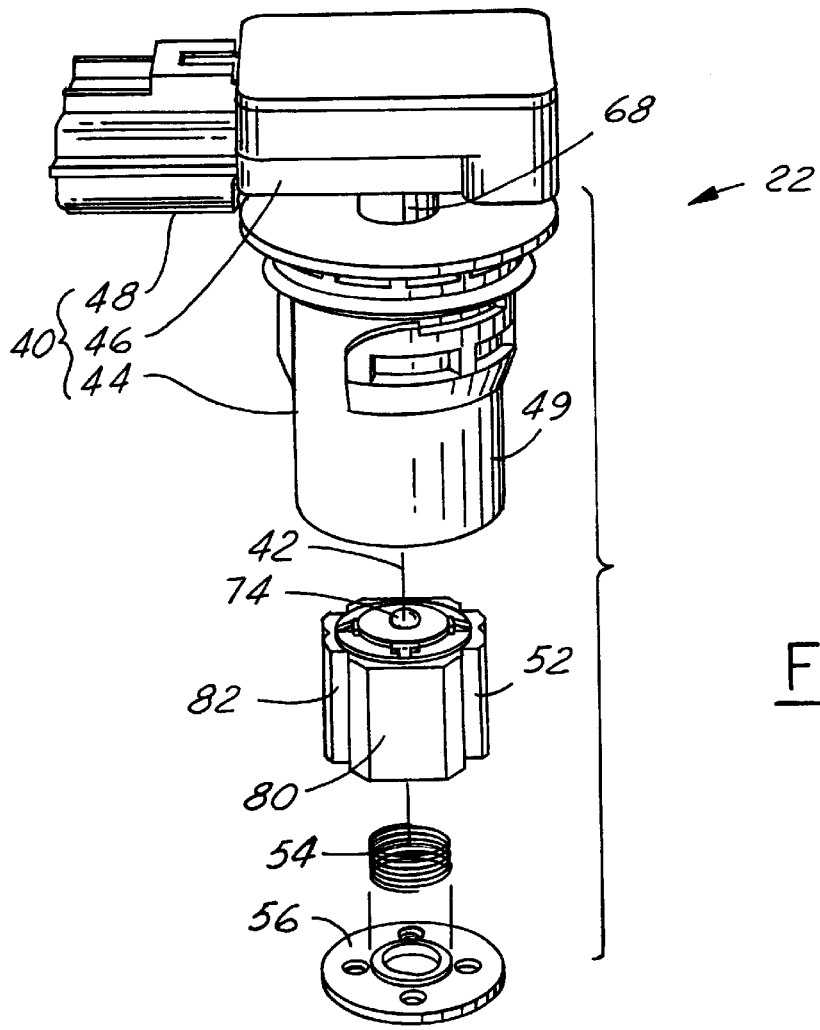
FIG. 4 is a perspective assembly view of the pressure sensor of FIG. 2.

Turning now to FIGS. 2–4, fuel tank pressure sensor assembly 22, includes body 40 defining axis 42. Body 40 may be molded of an acetyl material or any other material which provides good fuel permeability. That is, a material that is not affected by fuel thereby desirably preventing liquid or vapor fuel to permeate through body 40. Body 40 further includes rollover valve housing portion 44, pressure sensor housing portion 46, and connector housing portion 48. Portion 44 has a generally cylindrical body having side wall 49 and a hollow interior 50 for housing valve element 52. Element 52 is a heavier-than-liquid element and the operation of element 52 will be further described hereinafter. Vent portion 44 further includes spring 54 to bias element 52. Spring 54 is sized so as to cooperate with the buoyancy of element 52 such that, as the liquid fuel level rises, element 52 may seal, as will be further described hereinafter. To retain element 52 within the housing portion 44, end plate 56 is sonically welded thereto. Alternatively, end plate 56 may be attached to portion 44 by methods known to those skilled in the art and suggested by this disclosure. Portion 44 further includes O-ring 58 to sealingly engage tank 12 when pressure sensor assembly 20 is mounted thereto.

Body 40 further includes orifice 60 communicating between pressure sensor element 62 housed in pressure sensor housing portion 44, and chamber 50. Orifice 60 allows vapor communication between portion 44 extending into fuel tank 12 and pressure sensor element 62. Sensor element 62 is connected to a plurality of male connectors (not shown) housed within connector portion 48.

According to the present invention, mounting ledge 64 is formed on body 40 between portions 44 and 46 and lies adjacent the top edge of fuel tank 12 when assembly 20 is mounted thereon. Column portion 68 is disposed between portion 46 and mounting ledge 64 and contains orifice 60. Column portion 68 has a smaller cross-sectional area than mounting ledge 64 and portion 46, and, because of this feature, portion 46, together with connector portion 48 may shear from portion 44 in a controlled fashion. In this case, because valve housing 44 is below mounting ledge 64, fuel will be effectively retained with fuel tank 12 as will become apparent hereinafter.

Continuing with FIGS. 2–4, seal 70 is attached at the end of orifice 60 and also includes a hole 72 for communicating between orifice 60 and chamber 50. Further, element 52 includes a generally semispherical seal surface 74 which, in a rollover condition or as the liquid fuel level rises beyond a predetermined amount, cooperates with seal 70 to seal hole 72, and orifice 60, thereby effectively preventing liquid fuel from flowing out through orifice 60. Element 52 is formed with sufficient mass to allow gravity to cause element 52 to remain in the open condition during normal operation and in the closed position during a rollover condition. In addition, element 52 is formed of a generally octagonal shape element, having sides 80. In the embodiment shown in FIG. 3, some of sides 80 includes notch 82. Notches 82, together with the octagonal shape, prevent binding between element 52 and the inside surface of side wall 49.

Figure 5:
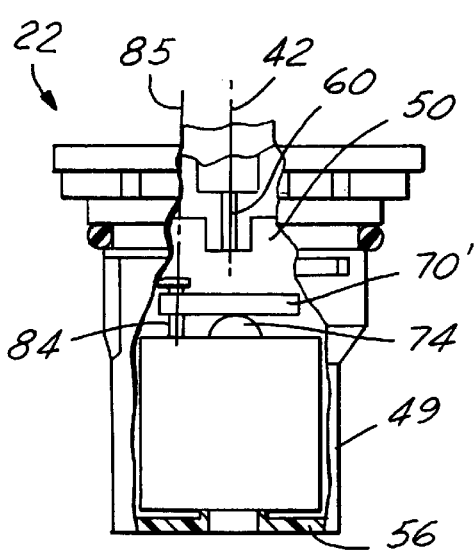
FIGS. 5 and 6 are alternative embodiments of the pressure sensor, respectively, according to the present invention.

Turning now to FIG. 5, an alternative embodiment of the present invention is shown. In this example, seal 70' is coupled to element 52 via extension portion 84, such as a rod, having an axis 85. Extension 84 is attached to element 52. Seal 70' is free to move along axis 85 of rod 84, such that as element 52 moves towards orifice 60, semi-spherical surface 74 can press against seal 70', which, in turn, presses against orifice 60, to effectively seal orifice 60. In this case, seal 70' does not include hole 72 as shown in FIG. 2.

Figure 6:
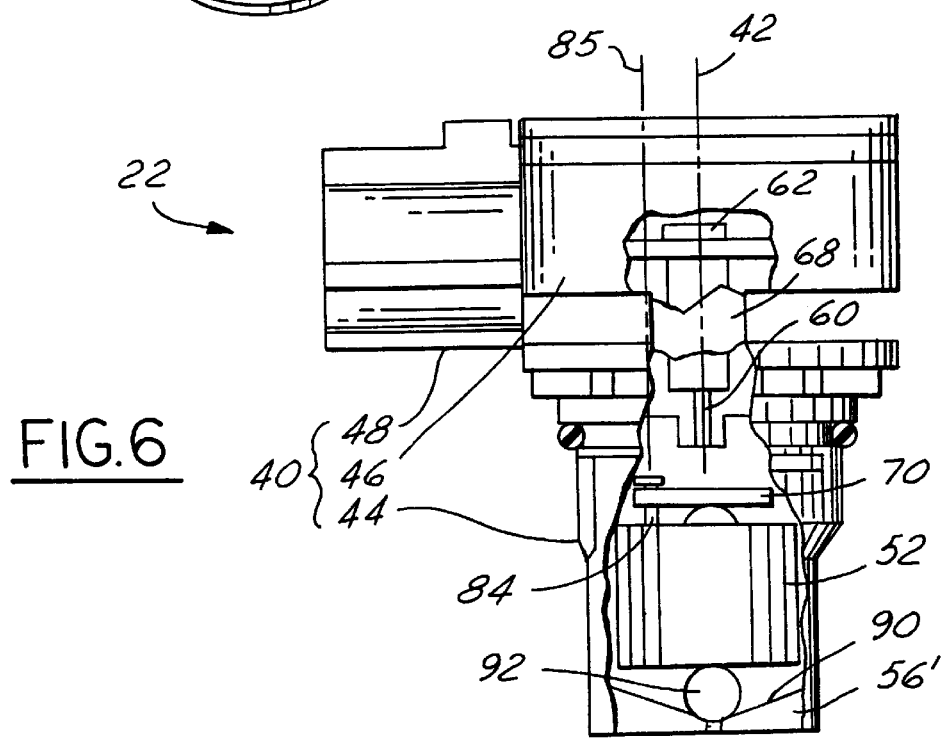

Referring now to FIG. 6, a third embodiment of the present invention is shown. In this example, seal 70' is coupled to element 52' via extension 84, as described with reference to FIG. 5. In this example, however, element 52' may be a lighter-than-liquid element. Further, end plate 56' is formed with frustoconical surface 90, which act as ramps, extending into housing portion 44. Ball bearing 92 is disposed between element 52' and end plate 56'. Under normal vehicle operation, the weight of element 52' allows communication between chamber 50 and orifice 60 such that the fuel vapor pressure may be sensed by sensor 62. If the vehicle experiences a severe tip angle, the buoyant force of the liquid fuel cooperating with the force of ball bearing 92 rolling up frustoconical surface 90, causes element 52' to move to the closed position. In the case of a complete rollover, the weight of the ball bearing 92 will cause element 52' to remain in the closed position.

While the best mode for carrying out the invention has been described in detail, those skilled in the art in which this invention relates will recognize various alternative designs and embodiments, including those mentioned above, in practicing the invention that has been defined by the following claims.

We claim:

1. A fuel tank sensor assembly for an automotive fuel tank, with said fuel tank sensor assembly comprising:

a body defining an axis and having a rollover valve housing portion extending into the fuel tank when said assembly is mounted thereto and a pressure sensor housing portion extending away from the fuel tank when said assembly is mounted thereto;

a mounting ledge formed on said body between said rollover valve housing portion and said pressure sensor housing portion, with said mounting ledge being adapted to lie adjacent the fuel tank when said assembly is mounted thereto;

a pressure sensor disposed within said pressure sensor housing portion;

an axial extending column extending between said rollover valve housing portion and said pressure sensor housing portion, with said column including an orifice extending therethrough to allow said pressure sensor to sense fuel vapor pressure within the tank, with said column having a smaller cross-sectional area relative to both said mounting ledge and said pressure sensor housing portion, thereby allowing said pressure sensor housing portion to controllably shear from said rollover valve housing portion;

a rollover valve element disposed within said rollover valve housing portion for substantially restricting liquid fuel from flowing from the fuel tank through said orifice, with said rollover valve element having a generally semi-spherical sealing surface to seal said orifice under predetermined operating conditions;

an end plate attached to said rollover valve housing portion, with said end plate having a frustoconical surface extending into said rollover valve housing; and a ball bearing disposed between said end plate and said rollover valve element, with said ball bearing being able to move on said frustoconical surface thereby causing said valve element to move toward said orifice.

2. A fuel tank sensor assembly according to claim 1 wherein said rollover valve housing portion is a generally cylindrical hollow cavity and wherein said valve element has a generally octagonally shaped cross-section, with said octagonally shaped cross-section cooperating with said generally cylindrical hollow cavity to substantially prevent binding between said element and said valve housing.

3. A fuel tank sensor assembly according to claim 2 wherein said element includes notches formed along sidewalls thereof, with said notches further cooperating with said octagonal shape and said generally cylindrical hollow cavity to substantially prevent binding between said element and said valve housing.

4. A fuel tank sensor assembly according to claim 1 further comprising a seal formed at an interface between said orifice and said semi-spherical sealing surface, with said seal cooperating with said semispherical surface and said orifice to seal said orifice under predetermined operating conditions.

5. A fuel tank sensor assembly according to claim 1 wherein said body is formed of an acetyl material.

6. A fuel tank sensor assembly according to claim 4 further comprising an extension, defining an axis, formed on said valve element and extending in a direction parallel to said axis of said body, with said seal being mounted on said extension so as to be able to move along said axis of said extension.

7. A fuel tank sensor assembly for an automotive fuel tank, with said fuel tank sensor assembly comprising:
- a body defining an axis and having a rollover valve housing portion, including a generally cylindrical hollow cavity, extending into the fuel tank when said assembly is mounted thereto and a pressure sensor housing portion extending away from the fuel tank when said assembly is mounted thereto;
- a mounting ledge formed on said body between said rollover valve housing portion and said pressure sensor housing portion, with said mounting ledge being adapted to lie adjacent the fuel tank when said assembly is mounted thereto;
- a pressure sensor disposed within said pressure sensor housing portion;
- an axial extending column extending between said rollover valve housing portion and said pressure sensor housing portion, with said column including an orifice extending therethrough to allow said pressure sensor to sense fuel vapor pressure within the tank, with said column having a smaller cross-sectional area relative to both said mounting ledge and said pressure sensor housing portion, thereby allowing said pressure sensor housing portion to controllably shear from said rollover valve housing portion; and
- a rollover valve element disposed within said rollover valve housing portion for substantially restricting liquid fuel from flowing from the fuel tank through said orifice, with said rollover valve element having a generally semi-spherical sealing surface to seal said orifice under predetermined operating conditions, and said valve element also has a generally octagonally shaped cross-section including notches formed along sidewalls thereof, wherein said octagonally shaped cross-section and notches cooperate with said generally cylindrical hollow cavity of said valve housing portion to substantially prevent binding between said element and said valve housing.

8. A fuel tank sensor assembly for an automotive fuel tank, with said fuel tank sensor assembly comprising:
- a body defining an axis and having a generally cylindrical hollow rollover valve housing portion extending into the fuel tank when said assembly is mounted thereto, a pressure sensor housing portion extending away from the fuel tank when said assembly is mounted thereto, and a connector housing portion;
- a mounting ledge formed on said body between said rollover valve housing portion and said pressure sensor housing portion, with said mounting ledge being adapted to lie adjacent the fuel tank when said assembly is mounted thereto;
- a pressure sensor disposed within said pressure sensor housing portion;
- an axial extending column extending between said rollover valve housing portion and said pressure sensor housing portion, with said column including an orifice extending therethrough to allow said pressure sensor to sense fuel vapor pressure within the tank, with said column having a smaller cross-sectional area relative to both said mounting ledge and said pressure sensor housing portion, thereby allowing said pressure sensor housing portion to controllably shear from said rollover valve housing portion;
- a rollover valve element disposed within said rollover valve housing portion for substantially restricting liquid fuel from flowing from the fuel tank through said orifice, with said rollover valve element having a generally octagonally shaped cross-section and having notches formed along sidewalls thereof, with said octagonally shaped cross-section and said notches cooperating with said generally cylindrical hollow rollover valve housing portion to substantially prevent binding between said element and said rollover valve housing portion, with said valve element having a generally semi-spherical sealing surface to seal said orifice under predetermined operating conditions; and,
- a seal formed at an interface between said orifice and said semi-spherical sealing surface, with said seal cooperating with said semi-spherical surface and said orifice to seal said orifice under predetermined operating conditions.

9. A fuel tank sensor assembly according to claim 8 wherein said body is formed of an acetyl material.

10. A fuel tank sensor assembly according to claim 8 further comprising an extension, defining an axis, formed on said valve element and extending in a direction parallel to said axis of said body, with said seal being mounted on said extension so as to be able to move along said axis of said extension.

11. A fuel tank sensor assembly according to claim 8 further comprising an end plate attached to said rollover valve housing portion, with said end plate having a frustoconical surface extending into said rollover valve housing; and,
- a ball bearing disposed between said end plate and said rollover valve element, with said ball bearing being able to move on said frustoconical surface thereby causing said valve element to move toward said orifice.

* * * * *